| United States Patent [19] | [11] Patent Number: 4,834,762 |
| Nishibori | [45] Date of Patent: May 30, 1989 |

[54] ANIMAL PROTEIN RESIN-PLASTIC COMPOSITIONS AND MANUFACTURES INCORPORATING ANIMAL SKINS AND/OR LEATHER AND/OR GELATIN POWDER THEREIN, THE POWDER THEREIN, AND METHOD OF PRODUCING THE SAME

[75] Inventor: Sadao Nishibori, Tokyo, Japan

[73] Assignee: Ein (America) Inc., New York, N.Y.

[21] Appl. No.: 68,347

[22] Filed: Jul. 1, 1987

[30] Foreign Application Priority Data

Aug. 7, 1986 [JP] Japan ................................. 61-185900
Aug. 7, 1986 [JP] Japan ................................. 61-185896
Mar. 14, 1987 [JP] Japan ................................. 62-59832

[51] Int. Cl.$^4$ ............................................. D06M 3/00
[52] U.S. Cl. ................................. 8/94.1 R; 8/94.1 D; 524/10; 524/11
[58] Field of Search ....................... 530/353, 356, 842; 524/10, 11, 21; 8/94.1 R, 94.1 D

[56] References Cited

U.S. PATENT DOCUMENTS 1,302,463  4/1919  Campbell ............................. 524/11
3,663,472  5/1972  Raymond ............................. 524/11

Primary Examiner—Paul Lieberman
Assistant Examiner—John F. McNally
Attorney, Agent, or Firm—Shlesinger & Myers

[57] ABSTRACT

The present invention relates to methods, compositions, and articles manufactured from scrap treated skin and/or leather which has been finely pulverized and mixed with synthetic resin. It further includes a method for the manufacture of improved leather products made from animal skin and/or leather and/or animal gelatin including the products derived therefrom and the method of producing skin and/or leather powder by use of steam and pulverization for combining with a fluid plastic material or resin in which the powder is uniformly dispersed in the plastic resin material for molding, extruding or manufacture of sheet material or for incorporation into coatings, paint or other plastic resinous products.

28 Claims, 9 Drawing Sheets

101 kx  20 kv  463

100 kx  20 kv  461

| MESH (NO/INCH) | SIZE (μm) |
|---|---|
| 3.5 | 5,800 |
| 3.85 | 5,000 |
| 4.0 | 4,750 |
| 4.7 | 4,000 |
| 5.5 | 3,350 |
| 6.5 | 2,800 |
| 7.5 | 2,360 |
| 8.6 | 2,000 |
| 10 | 1,700 |
| 12 | 1,400 |
| 14 | 1,180 |
| 16 | 1,000 |
| 18 | 850 |
| 22 | 710 |
| 26 | 600 |
| 30 | 500 |
| 36 | 425 |
| 42 | 355 |
| 50 | 300 |
| 60 | 250 |
| 70 | 212 |
| 74 | 200 |
| 83 | 180 |
| 93 | 160 |
| 100 | 150 |
| 119 | 125 |
| 140 | 106 |
| 149 | 100 |
| 166 | 90 |
| 200 | 75 |
| 235 | 63 |
| 281 | 53 |
| 330 | 45 |
| 390 | 38 |
| 448 | 32 |
| 518 | 26 |
| 580 | 22 |

FIG. 12

ANIMAL PROTEIN RESIN-PLASTIC COMPOSITIONS AND MANUFACTURES INCORPORATING ANIMAL SKINS AND/OR LEATHER AND/OR GELATIN POWDER THEREIN, THE POWDER THEREIN, AND METHOD OF PRODUCING THE SAME

The present invention pertains to improved leather products made from animal skin and/or leather and animal gelatin and methods of manufacturing the same. It also pertains to the method of reducing animal skin and/or leather to a fine powder compatible with resin and plastic compounds.

All vertebrates, including humans have skin containing collagen, a fibrous protein. Collagen protein is very complex structure, and insoluble in water. This invention also pertains to the method of pulverizing the collagen fibers to a fine powder form and compounding the powder with plastic to form a product superior to natural leather.

Prior art artificial leather had many shortcomings as compared to natural leather. This invention provides a manmade leather including material having the desirable qualities of natural leather such a feel, suppleness, texture, resistance to static electricity, and absorption. It is superior to natural leather because it does not have the disadvantages such as the need for constant care or susceptibility to mold, fading, and dirt. This reconstituted leather looks and feels better the longer it is used. Unlike the natural leather, it does not age as quickly.

BACKGROUND OF THE INVENTION

In the past, scrap skin and leather have been discarded as having no useful purpose. The pieces of scrap were insufficient to utilize for leather goods of the like. People had attempted to grind and pulverize the skin/leather and mix it with resins so that commercial articles could be made therewith. Skin and leather breathes and because of this it has a comfortable feeling when worn as a garment or as footwear. Synthetics generally do not breath. The prior art incorporating skin/leather into the resin was unsatisfactory because the particles of skin/leather tended to clump or lump together. The failure of the particles to be uniform in distribution throughout the synthetic resin material created undesirable characteristics to the material molded therefrom.

Natural leathers have long been used for clothing and other articles. They wear well and are supple and tough as well as attractive in appearance. Unfortunately, natural skins and leathers are limited in supply and because of troublesome tanning processes, become quite expensive when used in a manufacture of articles of clothing, accessories or the like. Because of different shapes and sizes of the original animals, a special skill is needed to cut and make them into clothes, etc. and scrap material and waste is common.

Previous attempts have been made to pulverize the skin/leather into a powder. When used with a resin, the powder tends to cake.

Recently, various artificial and synthetic leathers have been developed as a substitute for natural leather. One typical example is a synthetic leather comprising a substrate of woven or knitted fabric and a sponge-like surface made of formed compositions such as vinyl chloride, polyamides or polyurethanes treated with the denatured polyamides, polyurethanes, or polyacrylic acid derivatives.

Another example is an artificial leather having a porous structure comprising a three-diminsionally entangled fiber member made of special fibers such as hollow, lotus-root-like fiber, a bundle of very fine fibers, and a binder mainly of an elastomer(polyurethane) and the like.

These synthetic or artificial leathers have characteristics very similar to those of natural leathers and have excellent insulating qualities and yet have excellent air and moisture permeability and water repellency. However, water absorption in these artificial and synthetic leathers occurs only through capillary action, and water absorption due to swelling of tissues does not occur in them. While air permeability is controlled in natural leathers as the porosity in the tissues is adjusted when the tissues swell, synthetic or artificial leathers do not have such an action.

Natural skins refer to untanned pelts. Natural leathers refer to leather tanned pelts. Tanned pelts require tanning treatment with tanning or chrome. Numerous attempts have been made to pulverize natural skin/leather into a powder and to mix it with synthetic resins to be molded into sheet using the resin as a binder. If natural skin or leather could be molded together with synthetic resin, in a proper manner, a number of advantages would be apparent. For one, the presence of natural skin or leather in the molded product would improve water and moisture absorption due to swelling and provide a molded product having an excellent feel without stickiness. Secondly, the presence of skin or leather powder in the molded product should provide suppleness and resillient toughness to the product not obtained in other resin molded products.

Thirdly, the presence of skin and leather powder should reduce static build-up and eliminate the static discharges and the discomfort caused thereby. It would also reduces the adherence of dust caused by static build-up.

Further, the heat insulating property of the resin molded products containing skin and leather powder should be greatly improved.

Difficulties have been experienced in pulverization, since longer fibers sometimes became entangled depending on the type of skin or leather (whether pelt of a pig or cow; a particular portion of a pelt, etc. or other properties such as whether the pelt is of a young animal or of an adult; or the type of tanning or storage conditions under which the pelts were treated).

Furthermore, problems have been encountered in going from a pilot plant to actual production.

Other problems have been noted and it was also found that due to forced drying and impact shearing, grains of the skin or leather powder got entangled and took on an appearance of unraveled cotton during storage. This powder eventually flocculated making it difficult to mix it with synthetic resin.

Flocculated skin or leather powder will not ordinarily mix evenly in the synthetic resin due to the lack of lubricity. This making it impossible to give the product properties specific to leather and interferes with the good characteristics of the molded resin itself.

The presence of flocculated skin or leather powder further led to defectively high increases in resistance in the mixing cylinders, die tools used for extrusion or injection molding. Thus wear of the cylinder inner wall or damage to the dies or molding tools developed. When resistance in extrusion or injection was high, it was necessary to use larger molding machines and the molded products had deformations due to shrinkage, etc.

Although the problem of fluidity in molding with a calender roll might have been minimal, flocculated skin or leather contained in the synthetic resin would often agglomerate or cake, and the product would become uneven on the surface. The caked skin/leather powder would also cause cuts or abrasions in the surface of the resin material.

Further in the past, when mixed with a paint, the flocculated skin or leather powder became unevenly distributed in the coating layer causing bumps or scars in the coated surface. Additionally, the paint, when used in a spray gun, tended to clog the nozzle of the gun.

Other problems in the prior developments occurred when a film of less than 0.1 mm thickness was to be produced. The powder caused bumps in the film and weakened certain areas which eventually led to tearing of the film.

Further, in the prior art method, problems of uneven grain size distribution and longer fibers were encountered in pulverizing cow hides because of their tough collagen fiber. With pig skin, on the other hand, oil/fat content in the skin hampered the efficiency of pulverization.

OBJECTS AND SUMMARY OF THE INVENTION

An object of this invention is to provide a skin/-leather powder which does not agglomerate or flocculate, but maintains a granular state during the process of its manufacture, storage or when mixed with synthetic resin.

Another object of this invention is to provide a molded product using a mixture of synthetic resin and uniformly distributed skin/leather powder so that the product will have combined characteristics of both leather and molded resin.

Still another object of the present invention is to provide a skin/leather powder which can be uniformly distributed in a liquid such as paint, so that the coated layer of the paint will be uniformly distributed with the powder.

A further object of this invention is to provide a skin/leather powder which effectively mixes with synthetic resin solutions, emulsions or molten (including liquid polymers) resins to be used as a coating or material for making transfer films for lamination.

Yet a further object of this invention is to pulverize the powder and make it "granular" rather than "fibrous". The granules do not become entangled permitting the producing of finer powders which will not flocculate and which will have a specific gravity of about 0.38–0.5 g/cc. Granular powder does not require special separation techniques and longer grains can be used and mixed well with resin because of their high lubricity permitting uniform distribution in the molded product. This permits "loading" (increasing the amount of powder ordinarily used) without seriously affecting the resultant product.

Another object of this invention to produce a product having an excellent insulating factor which is soft to the touch and is not sticky.

Still a further object of this invention is to provide a leather/plastic product which is supple, tough and durable as well as having a natural lustrous leather appearance.

Still a further object of this is to provide a method which allows for the utilization of waste material such as scraps of various leathers in various shapes and sizes heretofore discarded.

A further object of this invention is to provide a leather powder which can be easily added to a plastic resin composition.

Yet another object of this invention is to provide a leather composition having characteristics similar to natural leather and having excellent air and water permeability and moisture absorption.

Yet a further object of this invention is to provide a leather composition in which the porosity of the material adjusts in the manner of natural leather to permit the material to breath even when absorbing moisture.

Yet another object of this invention is to provide a resin and leather powder mixture which can be molded, extruded, or otherwise formed into sheet material which is lustrous and has an excellent feel.

Still further object of this invention is to provide a leather composition which prevents static build-up and adherence of dust thereto as well as elimination or reduction of static discharge.

Yet a further object of this invention is to provide a leather composition which has high insulating properties.

Still a further object of this invention is to provide a method for pulverizing simultaneously various different types of skins, pelts or hides whether of young animal or adult or of different types of animals.

Another object of this invention is to provide a method for producing a powder form leather which avoids entanglement of the fibers or unraveling during storage making it difficult to mix with synthetic resin.

Still another object of this invention is to provide a method for producing a powder which will reduce wear and tear on machinery dies and other tools used in the production thereof.

Another object of this invention is to provide a leather composition which has sufficient fluidity to prevent problems during calendering or production operations.

Yet another object of this invention is to provide a composition which will mix with paints readily without causing lumps or agglomation thus giving a smooth flowing paint, and thus avoiding surface defects in the paint when applied, and to provide a paint in which the films or coating will stand up under harsh conditions without cracking, crazing or the like.

The growing importance of computers and other sophisticated machinery in today's complex world is axiomatic. Plastic is an indispensable part of this equipment. Higher quality plastics facilitate the production of even more advanced equipment. Thus, another object of this invention is to provide a new compound of collagen gelatin and plastic which is absorbent, supple, attractive to the eyes and similar to natural leather, and which has the same texture and feel as natural leather with pliancy in temperatures as low as $-40°$ C. with a feeling of warmth in cold weather and coolness in hot weather.

Still another object of this invention is to provide a gelatin-plastic material which is not sticky to the touch and which is air permeable so that it is resistant to water and wear and does not mold or fade.

Still another object of this invention is to provide a gelatin-plastic compound which can be cleaned and dyed easily and treated like natural leather with shoe polish, leather cleaner, or the like.

Yet another object of this invention is to provide a collagen gelatin and plastic composition which is electroconductive and resistant to static electricity and does not readily attract dust.

A further object of this invention is to provide a gelatin plastic material which can be processed with leather working equipment into suede, embossed leather, shrunken leather, corrected grain leather, enameled leather, or mat leather. For embossing, it can take on the texture of crocodile, ostrich, elk leather etc.

Still a further object of this invention is to provide a gelatin plastic which is more absorbent and more durable and oil-resistant than ordinary plastic.

Another object of this invention is to provide a gelatin plastic composition having greater adhesive properties than ordinary plastic when in the fluid state.

Yet another object of this invention is to provide a gelatin plastic material for use on tool surfaces and which is more stable on wet or frozen roads than synthetic rubber and has excellent vibration and shock resistance. This makes it also useful in automobile frames.

Another object of this invention is to provide a gelatin plastic composition which is easier to shape, inject or extrude than ordinary plastic and retains its resilient stable qualities even under temperatures as low as $-40°$ C.

In summary, this invention relates to the production of a leather powder which can be used in furniture or furnishings, paint, or molded materials or the in the production of leather type products for use in the automotive, boating, or aircraft industries or the like.

These and other objects of this invention will be apparent from the following description and claims.

In the accompanying drawings which illustrates by way of example various embodiments of this inventions;

Figure 11:
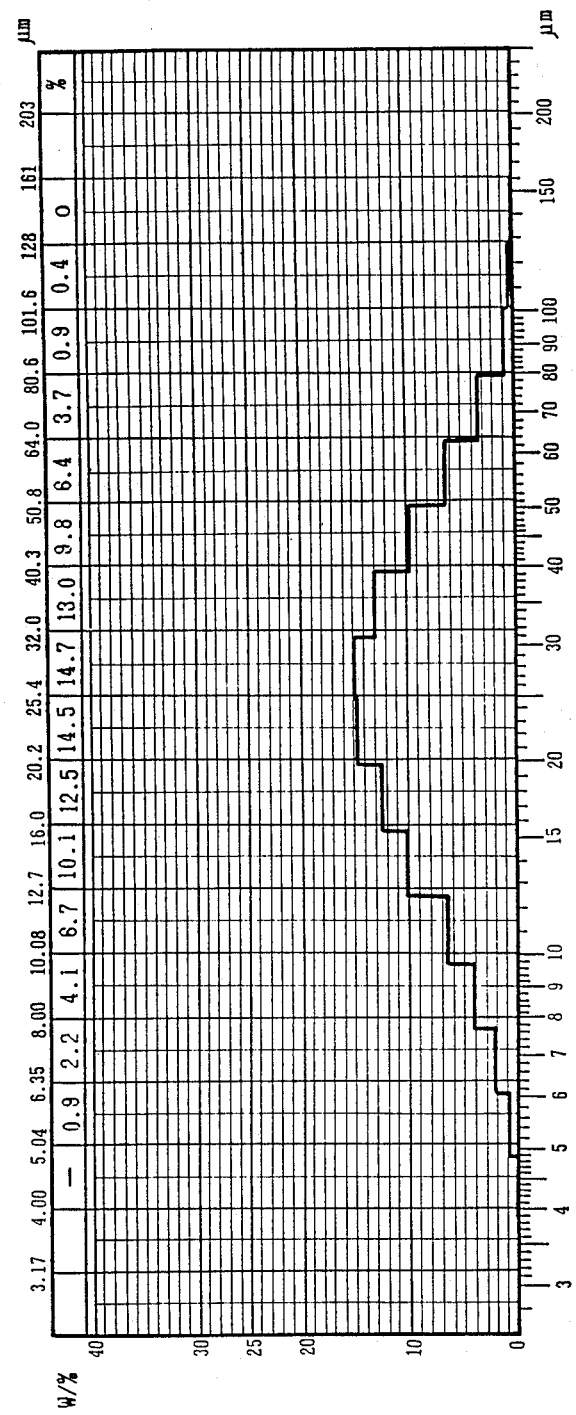

FIG. 11, is a graph showing the grain distribution of the skin/leather powder according to the modified invention. In this figure, the ordinate represents the amount of distribution in weight percent and the abscissa the grain size in microns. Numerical values given the graph represent the amount of distribution by weight percent.

FIG. 12, is a reference list to show the correspondence between mesh size and micron size.

FIGS. 1 THROUGH 3,

In order to obtain a fine powder having a specific gravity of about 0.38 to about 0.5 g/cc, which will not cake or agglomerate when mixed with a synthetic resin, it has been found necessary to treat the skin and/or leather tanned with chrome or tannin with steam.

First the skin and/or leather is shredded into strips or chips. Strips initially of 30 mm length were utilized; however, as shaven scraps are long and twisted, it was more desirable that they be cut to a size of about 5 mm prior to steam treatment.

The steam treatment is continued until the specific gravity of the skin/leather powder to be produced reaches 0.38–0.50 g/cc. Duration of the steam treatment varies depending on the nature and amount of the skin/leather to be treated and the pressure and temperature of the treatment chamber.

Figure 1:
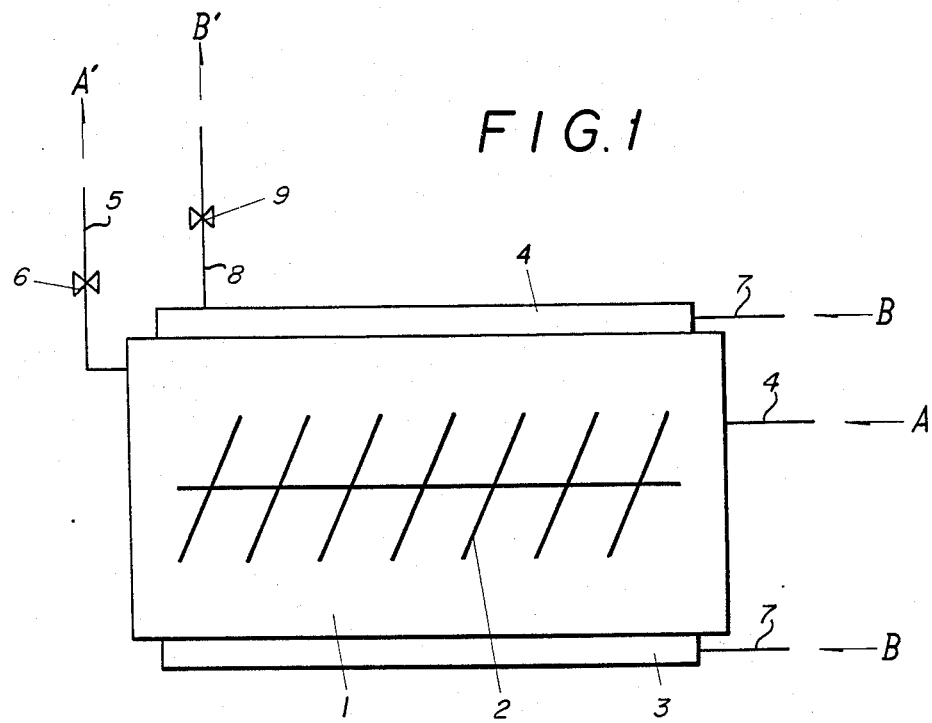
FIG. 1, is a schematic view of an apparatus for heating skin/leather with steam.

Chips or strips after cutting are charged into the closed treating chamber 1 as shown schematically in FIG. 1. The treating chamber 1 includes an agitator diagrammatically shown at 2. A steam jacket 3 encloses the chamber 1. Steam A is fed into steam line 4 and exhausts from steam line 5. A valve 6 controls the pressure in the chamber 1 to about 1 kg/cm$^2$. The chamber is maintained at between 100° C.–119° C. and the charge is agitated for about 30 minutes.

The steam treatment is designed to increase the water content of the charge by about 5–10 wt. percent depending on the type skin and/or leather in the charge. The steam jacket 3 is provided with a steam in-feed line 7 and exhausts at B' through line 8 having a control valve 9. Thus steam A as well as steam B can be applied to the chamber 1 with exhaust of steam A' and B' respectively from both the chamber 1 and the jacket 3.

The jacket 3 is used to simultaneously effect heating from the outside as well as from the inside of the chamber 1. Adjustment is made to obtain a water content in the skin and/or leather to about 15 wt. percent or less (primary drying).

A secondary drying is necessary to reduce the water content to about 5 wt. percent or less and ideally approximately 3 wt. percent or less. The resultant charge is subsequently pulverized into a powder.

The use of split or shaven leather which has been tanned with chrome or tannin prevents fungus and deterioration of the powder during processing. Heating time in the chamber is determined by the temperature of the steam, pressure, type of chips or strips in the charge etc. The steaming is maintained for a sufficient time at a temperature ranging from between 100° C. and 119° C. to permit swelling and unraveling by the steam of the collagen fibers in the chips or strips. The fibers tend to shrink upon heating thus permitting the unraveling and loosening of the fibers preparatory to pulverization. The higher the temperature and pressure, the shorter the heating to achieve the desired swelling effect. Temperatures and pressures too low, make the process unsuitable for production. It should be noted that chrome or tannin tanned skin and/or leather having been steam-heated for swelling, tend to evaporate so that the collagen fibers shrink and loosen and become somewhat disentangled with each other.

Skin and/or leather not tanned becomes hardened after drying making it impossible to pulverize the same. It was found, that where the skin and/or leather had not swollen fully, the resultant powder showed flocculation and had an apparent specific gravity 0.2–0.3 g/cc which was below the required about 0.38–0.5 g/cc.

It was also found that if the water content of the skin and/or leather material is extremely low (20–30 wt. %), the resultant powder obtained also flocculated and had a specific gravity too low of 0.2–0.3 g/cc. Thus, a specific gravity of 0.3 g/cc or lower is impractical for actual use. Further, if the skin and/or leather is heated in boiling water and in essence cooked, it will harden and be unsuitable for use despite subsequent treatments.

EXAMPLE 1A and 1B

Pulverization is carried on in a pulvering mill such as a Fine Victory Mill (not shown).

(Example 1A) The Fine Victory Mill is operated at 7000 rpm, no-load/loaded operation at 17.2/20 (ampere) with a slot half opened. In another example or operation, the rotation was 7800 rpm, no-load/loaded operation at 15.8/20 (ampere) and with the slot fully opened (Example 1B).

The skin/leather powder thus obtained was sifted using a 40 mesh sieve and the grain size distribution was studied.

| Example 1A | | |
|---|---|---|
| Under Sieve | Above Sieve | Distribution Amount |
| 40 | 60 mesh | 2.8% |
| 60 | 80 mesh | 9.7% |
| 80 | 100 mesh | 9.7% |
| 100 | 150 mesh | 25.7% |
| 150 | 200 mesh | 13.9% |
| 200 | 300 mesh | 33.7% |
| 300 mesh | | 4.5% |

("40 mesh" of "Under Sieve" means the skin/leather powders which passed 40 mesh sieve and "60 mesh" of "Above Sieve" means the skin/leather powders which did not pass 60 mesh sieve.)

Skin/leather powder was obtained by a similar treatment except that a coloring process was included in the steam-heating has the following grain distribution:

| Example 1B | | |
|---|---|---|
| Under Sieve | Above Sieve | Distribution Amount |
| 40 | 60 mesh | 5.7% |
| 60 | 80 mesh | 7.0% |
| 80 | 100 mesh | 5.7% |
| 100 | 150 mesh | 39.4% |
| 150 | 200 mesh | 30.0% |
| 200 | 300 mesh | 12.2% |
| 300 mesh | | 0% |

Skin/leather powder having the above grain distributions are suitable for use in mixture with various resin materials for molding. Any type of molding methods such as calender roll, extrusion or injection can be used.

The skin/leather powder was measured to have a specific gravity of between about 0.38–0.50 g/cc.

The specific gravity as used in the present specification is an aerated bulk density. Powder is charged into a vessel of 100 cc capacity through a sieve by shaking the same, leveling off at the top and then weighing. The values are expressed by dividing the powder weight with 100.

The relation of mesh size micron in the grain size in this specification is shown in the attached list (FIG. 12).

EXAMPLE 2

Using an air classifier, the skin/leather powder was classified into different classes for use in thin films or layers such as paint, coating or laminated film according to the true specific gravity.

Figure 3:
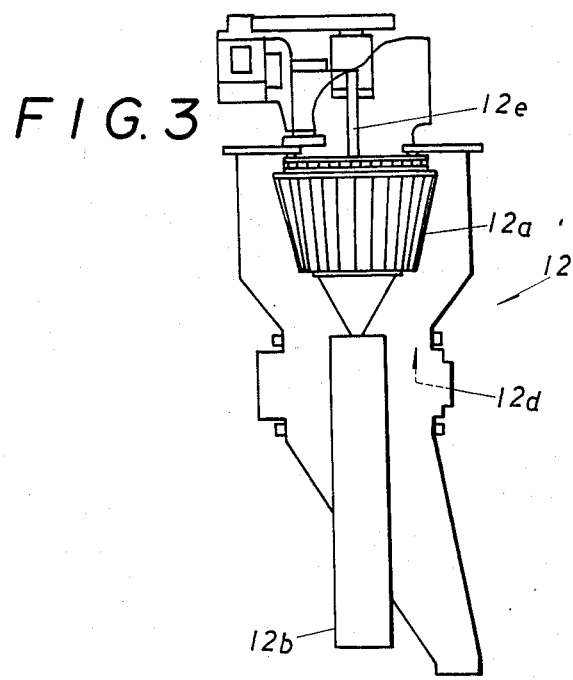
FIGS. 2 & 3, are schematic views of an apparatus for classifying the pulverized skin/leather according to the grain sizes.
Figure 2:
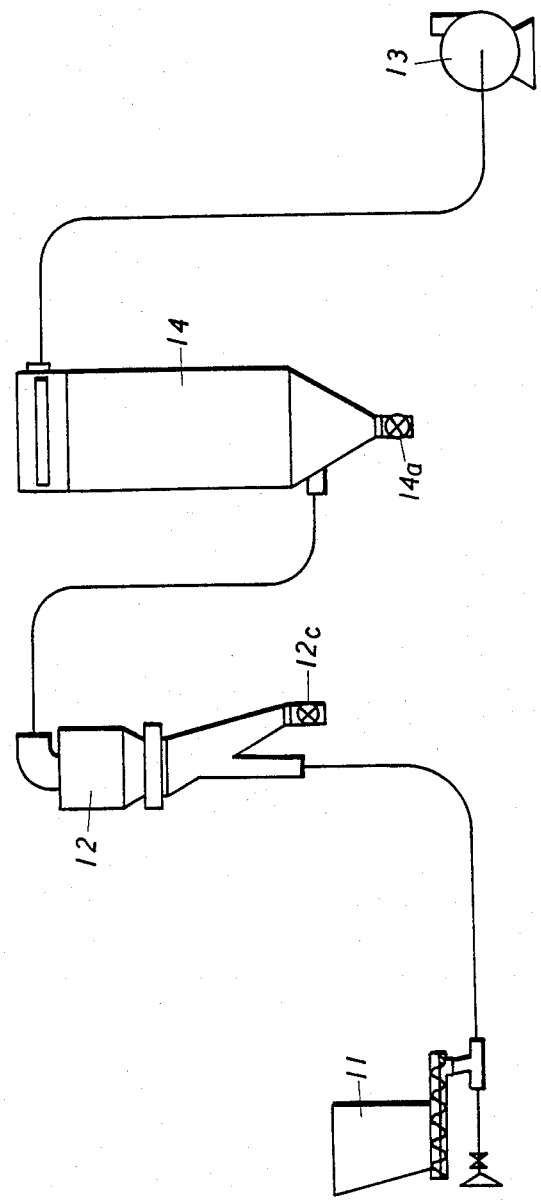

This classification will be described in conjunction with FIGS. 2 and 3. The reference number 11 denotes a feeder which introduces said skin/leather powder and continuously feed the same into an air classifier 12 (Micron Separator). The air classifier 12 has a rotor 12a which suctions and classifies the skin/leather powder supplied via an inlet port 12b according to the true specific gravity. A trubo-fan 13 feeds the powder into a back filter tank 14 for classification. Coarse powder is classified and taken out from a rotary valve 12c and fine powder from a rotary valve 14a. The reference number 12d denotes a secondary air inlet port, and 12e an outlet port for classified fine powder.

Using the classifier of the above construction, 5 kg of skin/leather powder was treated with the rotation of the rotor 12a at 600 rpm, secondary air supply of 4.0 m³/min and air for dust collection of 12 m³/min and 2.05 kg of fine powder was obtained.

As in seen in the graph (FIG. 11) showing the grain size distribution, the fine powder thus classified had a mean grain diameter of 24.5 microns, with the majority having that of less than 50 microns. The apparent specific gravity of the fine powder was 0.38–0.50 g/cc.

With the fine powder thus obtained, the powder grains do not become entangled and each discrete grain is present without flocculation or caking.

FIGS. 4 THROUGH 10

Figure 4:
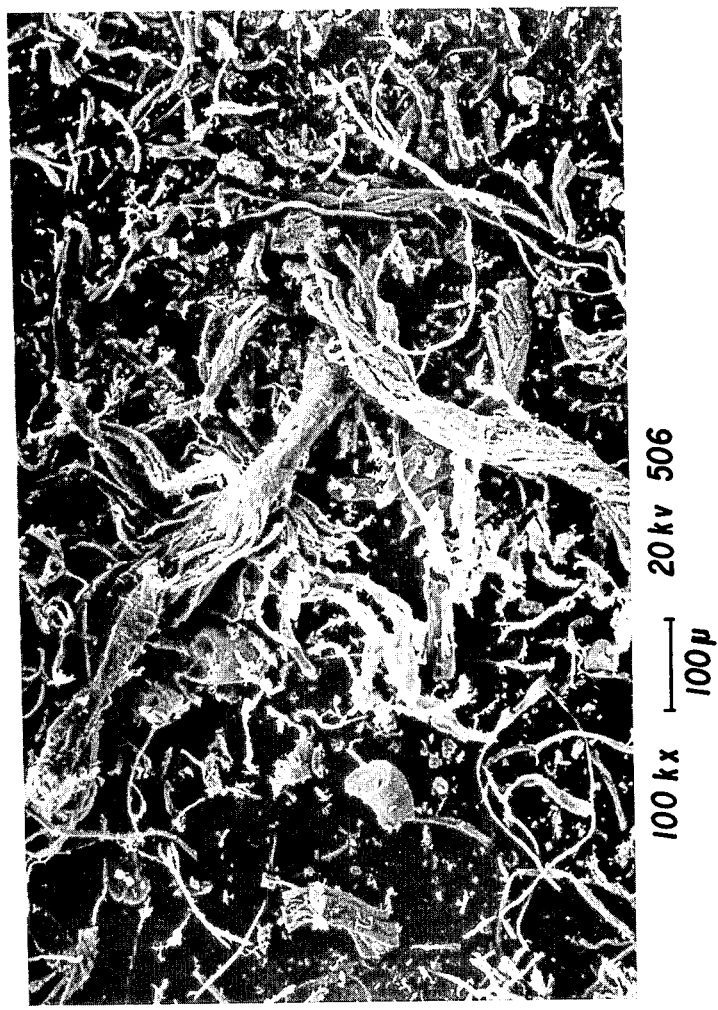
FIGS. 4, 5 & 6, are electron-microscopic enlargements magnified 100 times of pulverized skin/leather according to prior art methods.
Figure 5:
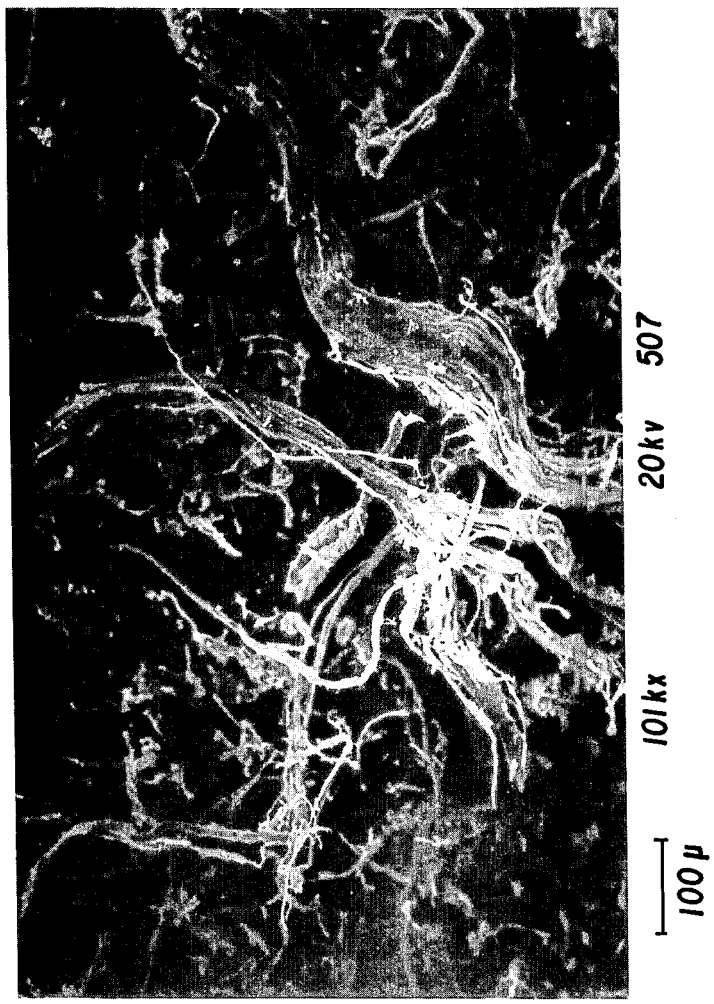
Figure 6:
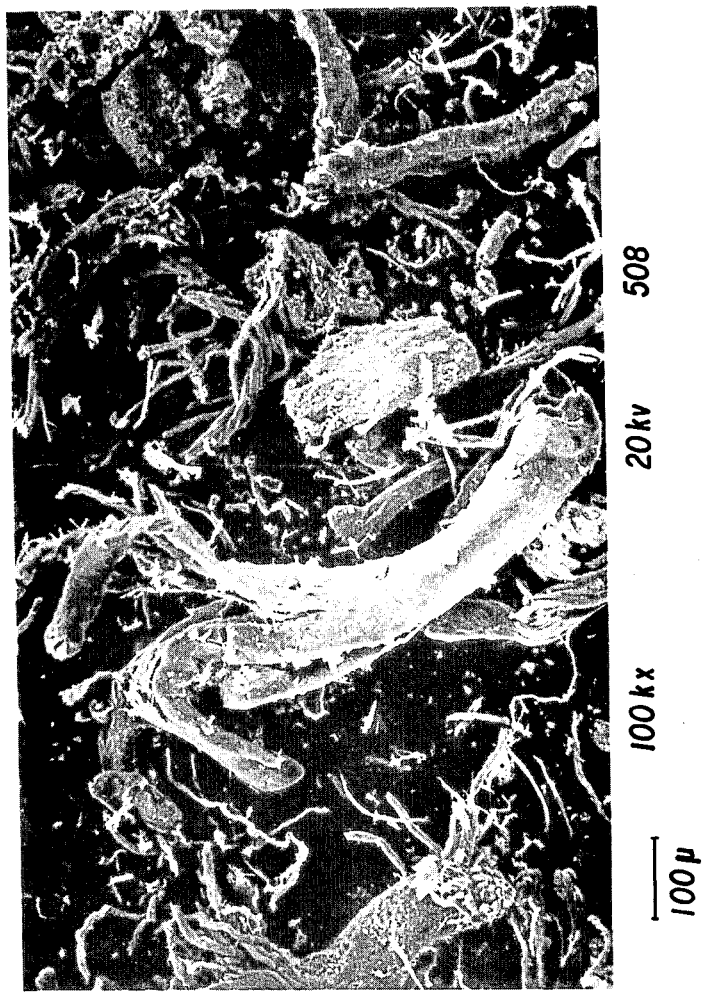

FIGS. 4 through 6, are microphotographs of test samples of powder produced from pulverization of the skin and/or leather which has been tanned chrome and shredded into strips about 30 mm length. The resultant material was dried to a water content of about 5 wt. percent (on a wet charged into a hammer-type pulverizing mill under the following conditions:

| EXAMPLE 3 | |
|---|---|
| Rotation | 3800 rpm |
| Sieve screen | 32 mesh |
| Charged material | 0.2 kg |
| Treatment time | 27 sec |
| Amount of product | 0.2 kg |

Upon pulverization under the foregoing conditions, the powder of skin/leather having the following grain size distribution was obtained (as measured in shorter diameter when the grain is fibrous).

| Under Sieve | Above Sieve | Distribution Amount |
|---|---|---|
| | 32 mesh | 0.8% |
| 32 | 48 mesh | 2.4% |
| 48 | 60 mesh | 8.2% |
| 60 | 100 mesh | 15.5% |
| 100 | 150 mesh | 18.4% |
| 150 mesh or smaller | | 54.75% |

The charge was not treated with steam.

The resultant specific gravity of the product thus obtained was very low at 0.1 to 0.2 g/cc. The images in FIGS. 4 through 6 are enlarged by 1.6 times at the of printing. Although grains finer than 150 mesh (ca. 100 microns) were predominant in the powder, longer fibers (ca. 800 microns) were also present, lowering the apparent specific gravity.

The test results were defective in that the longer fibers became entangled and unraveled depending on the types skin and/or leather used whether from pig or cow, young animal or adult, etc. The tendency became more pronounce in the transition from the pilot plant to actual production. During storage, the grains of powder became entangled and appeared as of unraveled cotton. When mixed with synthetic resin, the powder flocculated and became difficult to mix.

FIGS. 7 & 8

Figure 7:
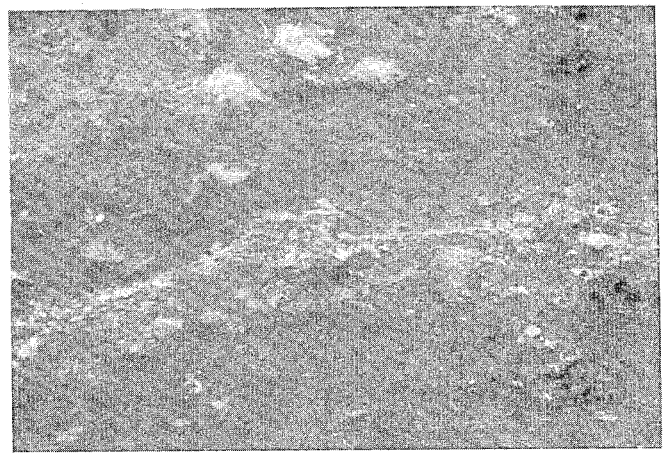
FIGS. 7 & 8, are photographic views showing the front and back of a calender-rolled sheet using skin/leather powder pulverized by a prior art method.
Figure 8:
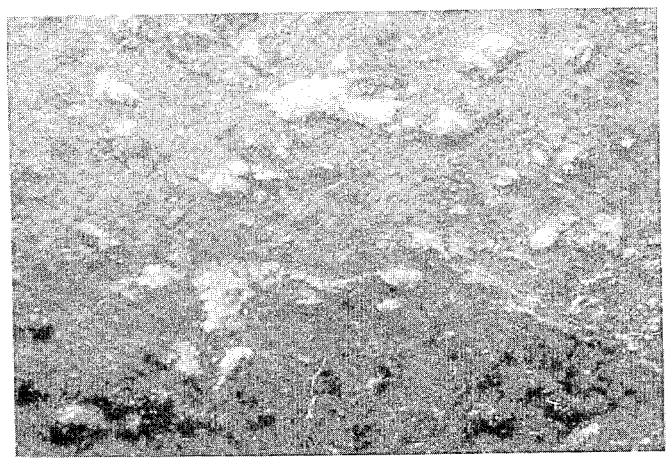

FIGS. 7 & 8, show a molded product of mixture of synthetic resin and the skin and/or leather powder produced in the manner above. FIG. 7 shows the front and FIG. 8 the back of a sheet molded by a calender roll and a magnification of ca. 2.6 times. Note the flocculated material shows irregularities on the surface of the sheet. This indicates that the resin and powder will not mix evenly and give uniform distribution. Under extrusion, such flocculation causes wear on the equipment. If the material is used in a paint, the flocculated powder tends to clog the nozzle of the spray gun.

FIGS. 9 & 10

Figure 9:
FIG. 9, is photographic electron-microscopic view magnified 101 times showing the skin/leather powder according to the present invention.
Figure 10:
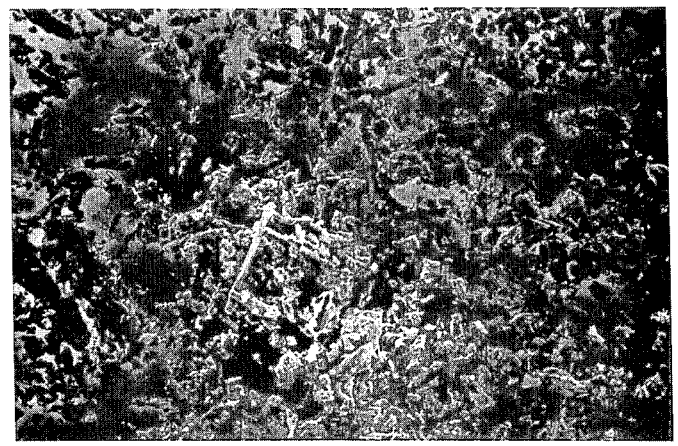
FIG. 10, is a photographic electron-microscopic view of the skin/leather powder magnified 100 times of a modification of the invention.

FIGS. 9 & 10, show microphotographs of the skin and/or leather powder made according to the invention.

FIG. 9, shows no fibers present and discrete grains disbursed in the powder to maintain "a granular state". This photograph shows that the specific gravity of the invention is substantially greater than that shown in the powders of FIGS. 4, 5 and 6. Using the classifier (12) 5 kg of skin/leather was treated with the rotor 12a at 600 rpm, secondary air supply of 4.0 m$^3$/min and air dust collection of 12 m$^3$/min, and 2.05 kg of fine powder was obtained. The fine powder classified has a mean grain diameter of 24.5 microns, with a majority have less than 50 microns. Thus the specific gravity of fine powder becomes greater and falls within the 0.38-0.50 g/cc. As compared with FIG. 9, FIG. 10 shows more uniformity and a higher specific gravity. Note also the fine grain sizes with no fibers or entanglement.

It has been determined from the various test conducted, that the apparent specific gravity is greater than 0.38 g/cc with no entangled or ciliary fibers.

The powder considered in FIG. 9, was filtered using a 40 mesh sieve and had an apparent specific gravity of 0.38-0.50 g/cc.

When this powder is mixed with various synthetic resins such as vinyl chloride depending on the purpose, it was found to become evenly mixed and distributed in the molded resin. Neither flocculation nor caking occured in the powder and each discrete grain is dispersed in the molded product. Extrusion and injection molding of the powder resin is similar to that of conventional resins thus preventing wear of apparatus. The powder of FIG. 10 contains more than 70 wt. % of grain smaller than 40 microns (as measured in smaller or shorter diameter if the grain is elongated). Although this powder is extremely fine and has a grain size of 40 microns or less, the powder did not flocculate in any of the processing, storage or molding steps with resin. Further, when mixed with paint, and particularly with resinous coating solutions, the powder mixes well without flocculating and its grains are evenly disbursed. This enables coating of the paint in a thin layer with the powder contained therein. The grains of the powder being very fine, do not affect the coated layer surface which becomes even and smooth.

With this development, it is also possible to produce an extremely thin resin film (0.1–0.01 mm), especially a laminated film, without causing unevenness of texture, deformation or warping on the surface. In the example where 70 wt. % of grains is smaller than 40 microns, the majority of the grain is approximately 100 microns or less and more particularly below 40 microns. The powder may be used to form a film on a release paper and then laminated on cloth, paper, resin film, leather, etc.

The attached graph (FIG. 11) shows the grain size distribution in weight percent measured by classifying the powder with a classifier and suspending the same in methyl alcohol to measure the grain size using a coal tar counter.

It is apparent from the graph (FIG. 11) that the powder contains 78.7 wt. % of fine powder with the grain size of 40 microns or smaller. As mentioned above, a powder having grain sizes slightly greater than this can also be used in mixing with said paint or coating material. Experiments conducted by the present applicant revealed that a good result can be obtained if more than 70 wt. % of powder is of a grain size smaller than 40 microns and if grains exceeding 150 microns are effectively cut into smaller sizes.

The leather powder mentioned above may become discolored if its fat content is high. Therefore, the powder is given fat removing treatment.

The fat removal treatment uses a solvent such as benzine, methyl chloride, methyl acetone, and ethyl acetate which elutes oils from leather. Another treatment washes the leather with hot water and elutes the fat content from the swollen leather. When using a solvent, the leather should preferably contain less amount of water. Therefore, the leather is ideally subjected to this elution treatment with the solvent either in the stage prior to steam heating, in the stage of drying after steam heating, or after the stage of pulverization after drying.

The skin/leather powder thus obtained can be dyed if desired. Suitable dyestuff and method for dyeing must be selected depending on the properties of the powder. For instance, if the powder is obtained from a skin/leather tanned with chrome, then acidic dyestuff such as mono-azo, anthraquinone and carbonium dyes which achieve uniform dyeing and osmotic action (permeation) were used. For a skin/leather treated with tannin, basic dyestuff such as azo, azine and thiazine were used. Acidic mordant dye, direct dye and reactive dye were also added depending on the use, properties of the powder, etc., and dyeing was conducted under moisture and agitation. After dyeing, the powder was dried.

The dyeing can be conducted concurrently with steam heating, or alternately, it can be conducted as a separate step under moisture after pulverization has been completed. Optimum methods can be employed to suit the conditions of each plant.

Application of powder according to the first invention

Using the powder classified by a 40 mesh sieve and mixed with synthetic resins such as vinyl chloride, various moldings were obtained.

Synthetic resins that can be used in mixture with the present invention powder include thermoplastics such as vinyl chloride, vinyl acetate, polyamides, ABS and polycarbonate, polyacrylates thermosetting plastics such as phenol, epoxy and urea base resins, polyurethane synthetic rubbers such as chloroprene, butadiene, styrene and olefin base rubbers, and other synthetic resins for molding.

As a typical example, soft sheet of vinyl chloride was molded using the following composition:
vinyl chloride resin: 100 wt. parts plasticizer: 90 wt. parts
stabilizer: 3 wt. parts
skin/leather powder: 80-200 wt. parts A natural leather-like soft sheet was obtained.

The following are the criteria for determining the amount of skin/leather powder to be mixed in resins for molding. (The values are expressed in weight percent, and "synthetic resin compound" means a mixture of resin, plasticizer, stabilizer, etc.)

(1) For molding sheets:
  skin/leather powder: 5-55%
  synthetic resin compound: 45-95%
  (synthetic resin compound containing 2-15% gelatin: 30-95%)
(2) For molding bars, plates and masses such as armrests for chairs, wall, furniture, automobile interior frames such as console boxes, handles, grips:
  skin/leather powder: 20-80%
  synthetic resin compound: 20-80%
(3) For molding containing industrial gelatin
  skin/leather powder: 5-70%
  synthetic resin compound (containing 2-15% gelatin): 30-95%
(4) For preparing intermediate material for such as pellets:
  skin/leather powder: 5-80%
  synthetic resin compound: 20-95%

Leather-like moldings of high quality were obtained by any of the above compositions.

The above compositions are suitable for molding soft, semi-hard moldings, and provide features adequate for each hardness. Foamed moldings are used to manufacture films, sheets plates, bars and masses mentioned above, and in foaming the resin compound mixed with the skin/leather powder, continuous or discrete intervals are formed between the powder and the resin.

Application of powder according to the Example 2

As the powder according to Example 2 is finer in grains, it has excellent lubricity and is sufficiently dry and thus mixes well with synthetic resin compounds.

Particularly, when 5-45 wt. % of the powder according to Example 2 was mixed with various synthetic resin solutions (solution, emulsion, or molten synthetic resin containing liquid polymer) and coated over cloth, non-woven cloth, paper, synthetic leather or leather, sheet products having a leather-like surface were obtained.

Similarly, when coated on metal products or resin moldings such as furniture, automobile interior parts and the like (by means of brush, spraying, etc.) for a thickness of between 0.01 and 0.1 mm, a coated surface having a leather-like appearance was obtained.

When said synthetic resin solution was a solution of polyurethane (either one-component type or two-component type), the surface coating layer or laminated film layer obtained had a better leather-like appearance.

It was further found that in applying paints containing the powder of the Example 2 by spraying and the like method, a smoother coated surface was obtained if the paint mixed with the powder was ground prior to use. This grinding further facilitates spraying of the paint.

It was also found that the powder of Example 2 could be applied on the surface of a resin molding, cloth, non-woven cloth, paper, leather or synthetic leather with adhesive.

In any of the above applications, the powder according to the present invention does not flocculate but disperses uniformly in the resin and causes no trouble in coating or spraying operations. Unlike the prior art powder of skin/leather, the powder according to the present invention will not clog the spray gun and can be easily used for spraying paint in the conventional manner.

Coated layer or film layer thus obtained provided a smooth surface without bumps or whitening phenomenon due to flocculation of the powder.

Post treatment for molded products

The surface of the molded products thus obtained is sanded or sand blasted to expose the powder content to the surface.

By immersing the product in hot water, portion of said gelatin or powder contained in the product can be induced to seep out and form fine pores on the surface.

The surface of products may by embossed with special patterns. (such as a pattern of a crocodile skin).

Dyes, oils and paints for leathers can be used with the powder of the present invention in the same manner as in the ordinary leathers.

Target products

As is evident from the foregoing, any type of resin moldings can be produced using the skin/leather powder of the present invention. The powder can also be used for spraying, coating and laminating. It is therefore possible to use the powder in molding everything that is used in daily life.

White this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

What is claimed is:

1. A method for producing a granular non-flocculating resin-plastic-compatible powder from treated animal skins, leather, or animal skins and leather having a specific gravity of about 0.38-0.50 g/cc, which includes:
   (a) providing tanned skin and/or leather;
   (b) cutting said tanned skin, leather, or skin and leather into chips and strips;
   (c) steam heating said chips, strips, or chips and strips to retain the natural structure of the leather for a time sufficient to permit said chips, strips, or chips and strips to swell and simultaneously cause the naturally occurring twisted and tangled collagen fibers therein to shrink and in so doing cause said twisted and tangled fibers to automatically loosen and become less twisted and tangled;
   (d) subsequently drying said steam heated chips, strips, or chip and strips; and
   (e) subsequently pulverizing said dried chips, strips, or chips and strips.

2. A method as in claim 1 and including:
   (a) cutting said chips, strips, or chips and strips into a lengths of about 30 mm in length prior to steam heating.

3. A method of claim 1 and including:
   (a) cutting said chips, strips, or chips and strips into a size of about 5mm prior to steam heating.

4. A method of claim 1 and including:
(a) steam heating said chips, strips, or chips and strips at between about 100° C.-119° C.

5. A method of claim 1 and including:
(a) steam heating said chips, strips, or chips and strips with agitation.

6. A method of claim 5 and including:
(a) steam heating at above atmospheric pressure.

7. The method as in claim 1 and including:
(a) increasing the water content of said chips, strips, or chips and strips during steam heating by about 5-15 wt. %

8. The method as in claim 1 and including:
(a) drying said chips, strips, or chips and strips to a water content of less than about 5%.

9. The method as in claim 1 and including:
(a) secondarily drying said chips, strips or chips and strips to a water content of less than about 3 wt. %.

10. The method as in claim 1 and including:
(a) steam heating said chips, strips or chips and strips with agitation for at lest about 30 minutes at a temperature of about 100° C.-119° C.

11. The method as in claim 1 and including:
(a) sifting said pulverizing granules using a sieve to obtain particle size distribution ranging from 40 to about 300 mesh.

12. The method as in claim 1 and including:
(a) drying said chips, strips or chips and strips during steam heating, and
(b) sifting said granules using a sieve to obtain particle size distribution ranging from 40 to about 300 mesh.

13. The method as in claim 11 and including:
(a) sifting said pulverized granules to have the greatest percentage of granules in the range of 200-300 mesh.

14. The method as in claim 12 and including:
(a) sifting said pulverized granules to have the greatest percentage of granules in range of 100 to 150 mesh.

15. The method of claim 1 and including:
(a) air classifying said granules in an air classifier to remove dust and sizing said granules into at least two classes by size of granules with at least one larger granule size class and one smaller granule size class.

16. The method of claim 1 and including:
(a) providing chrome tanned skin, leather, or skin and leather.

17. The method of claim 1 and including:
(a) providing tannin tanned skin, leather, or skin and leather.

18. The method of claim 1 and including:
(a) splitting said tanned skin, leather, or skin and leather prior to steam heating.

19. The method of claim 1 and including:
(a) shaving said tanned skin, leather or skin and leather prior to steam heating.

20. The method of claim 15 and including:
(a) air classifying said granules to have 70 wt. % of powder of a grain size less than about 40 microns.

21. The method of claim 1 and including:
(a) air classifying said granules to have 70 wt. % of powder of a grain size less than about 40 microns.

22. The method of claim 16 and including:
(a) dyeing said chrome tanned skin, leather, or skin and leather with an acid dyestuff.

23. The method of claim 17 and including:
(a) dyeing said tanned skin, leather, or skin and leather with a basic dyestuff.

24. The method of claim 1 and including:
(a) dyeing said pulverized granules.

25. The method of claim 1 and including:
(a) removing oils from said tanned skin, leather, or skin and leather prior to said steam heating.

26. The method of claim 1 and including:
(a) removing oils from said chips, strips, or chips and strips subsequent to said steam heating.

27. The method of claim 1 and including:
(a) removing oils from said powders subsequent to said pulverization.

28. The method of claim 1 and including:
(a) pulverizing said chips, strips, or chips and strips to an average micron size of less than about 100 microns and not exceeding a granule size of about 150 microns.

* * * * *